Oct. 18, 1949. O. GERBES 2,485,276
METHOD FOR INHIBITING CORROSION CAUSED BY
LIQUID ALUMINUM HALIDE CATALYSTS
Filed Sept. 23, 1944 2 Sheets-Sheet 1
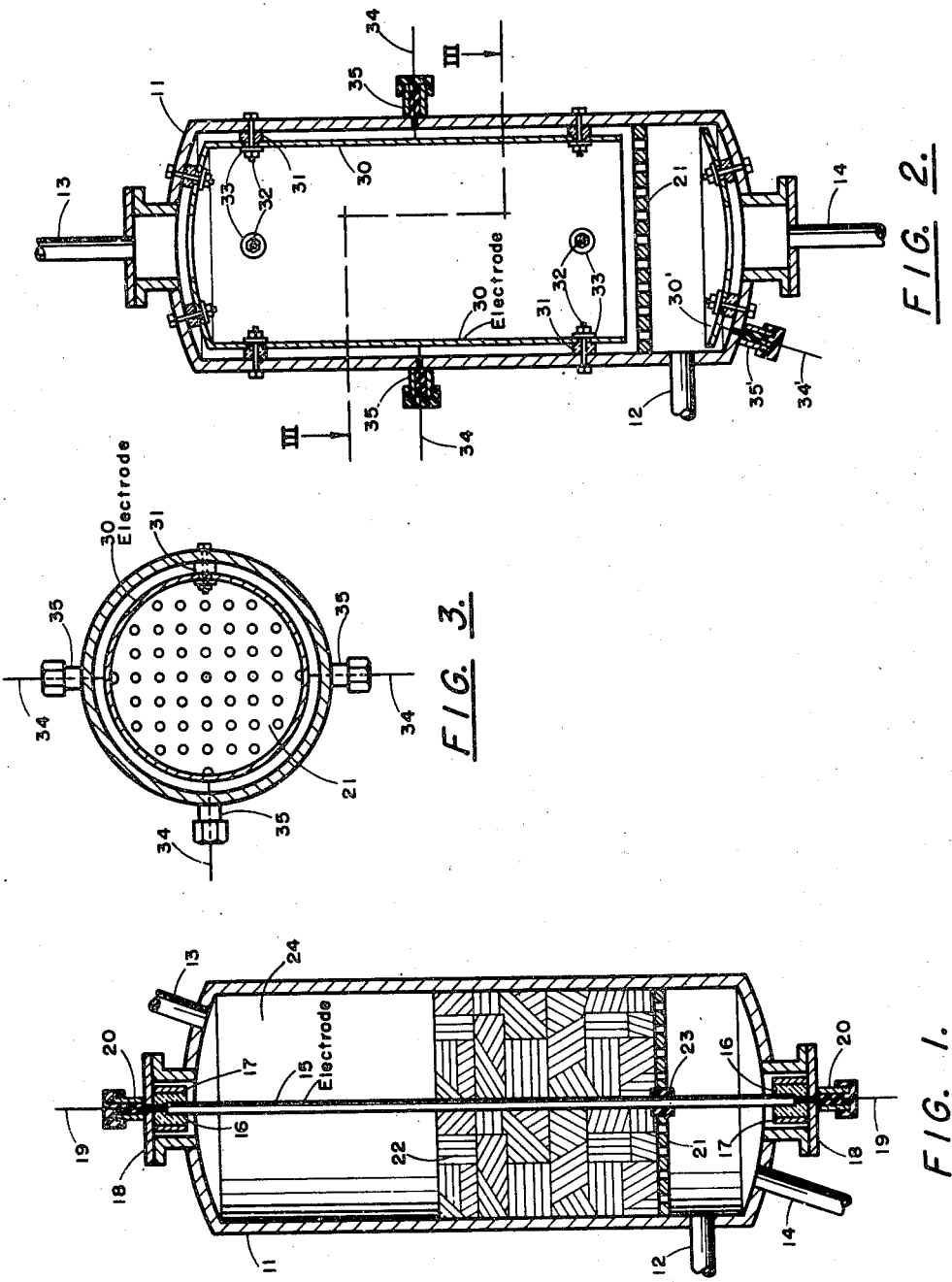
INVENTOR.
Otto Gerbes
BY
J. D. McKean
ATTORNEY.

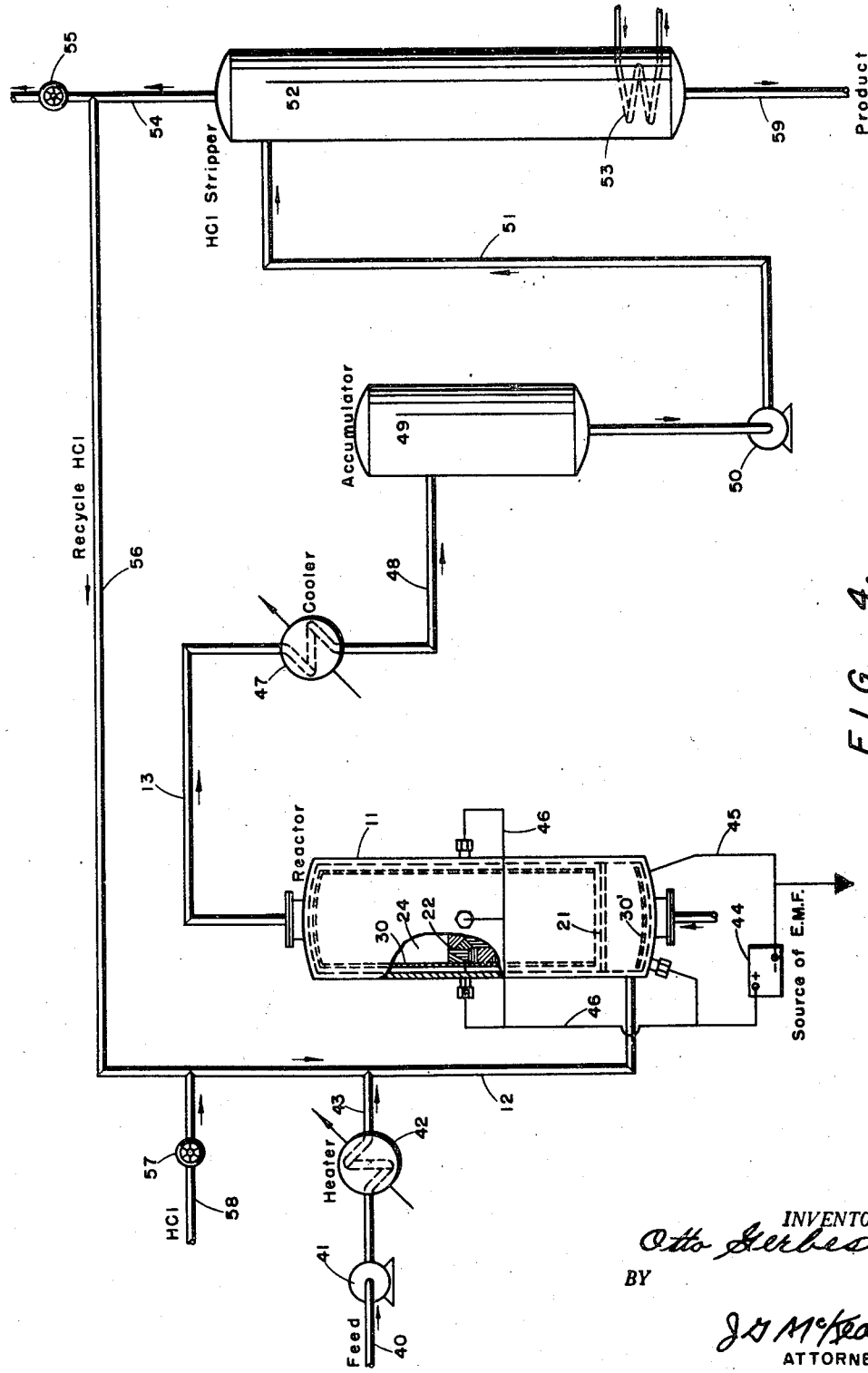

Patented Oct. 18, 1949

2,485,276

UNITED STATES PATENT OFFICE 2,485,276

METHOD FOR INHIBITING CORROSION CAUSED BY LIQUID ALUMINUM HALIDE CATALYSTS

Otto Gerbes, Goose Creek, Tex., assignor to Standard Oil Development Company, a corporation of Delaware Application September 23, 1944, Serial No. 555,483

4 Claims. (Cl. 260—683.5)

The present invention is directed to a method and apparatus for catalytically converting hydrocarbons. More particularly, it is concerned with catalytic conversion of hydrocarbons in which liquid, gaseous or mixed phase hydrocarbons are contacted with a liquid or fluid metal halide complex at temperatures in the range of about 150° to 300° F.

It is often desirable to conduct catalytic operations such as isomerization, alkylation, or polymerization reactions with the reactants contacting a metal halide catalyst in the form of a liquid complex. Examples of such operations are the isomerization of paraffinic hydrocarbons such as butane, pentane, hexane, heptane, and the like, and the alkylation of olefins with isoparaffins, for example, the alkylation of isobutane with propylene, butylenes or pentylenes.

The liquefying or fluidizing of the metal halide catalyst has been accomplished by numerous expedients. Thus, the literature has disclosed the employment of aluminum chloride and other metal halide as a complex with paraffin hydrocarbons, as a complex with olefins, cyclo-olefins, cyclo-paraffins or naphthenes, as complexes with aromatics or double complexes with aromatics known as Gustavson's compounds, complexes with organic acids which have been referred to in the literature as "Ansolvo Acids" (Annalen der Chemie, vol. 455, pages 227, 253); it has also been proposed to employ metal halides as solutions in various organic and inorganic solvents or compounds. For example, the aluminum halides and other metal halides may be employed as solutions in chlorinated hydrocarbons such as orthodichlorobenzene, and the like. Solutions of the aluminum halides in alkyl halides have also been proposed for catalytic reactions.

However, there is one great objection to the employment of this fluid or liquid type of metal halide catalyst in that the liquid catalyst has been found to be very corrosive to metallic equipment with which it comes into contact during the catalytic reactions. The operators of catalytic reactions employing liquid metal halide catalyst are plagued with the aforementioned corrosive problem which often is so destructive to the equipment that the equipment must be shut down at frequent intervals for repair to prevent its ultimate destruction.

It is, therefore, the main object of the present invention to provide catalytic conversion processes in which the corrosive effect of the above mentioned type of catalyst has been substantially overcome.

Another object of the present invention is to provide a new type of apparatus for conducting conversion reactions employing liquid type metal halide catalyst in which the corrosive tendency of the metal halide catalyst is overcome by imposition of an electric potential between electrodes within the catalytic apparatus.

In catalytic reactions of the general type referred to above such as, for example, isomerization operations, a hydrocarbon such as n-butane is contacted with a liquid or semi-liquid catalyst (usually comprising aluminum chloride, hydrocarbon, and hydrogen chloride) at a temperature of 150° to 300° F., but usually at 180° to 220° F., and under a pressure of 150 to 400 pounds per square inch, depending upon whether liquid, vapor, or mixed phase operation is desired. A promoter, such as hydrogen chloride, is usually introduced into the reactor feed prior to contact of the latter with the catalyst. The catalyst may be a body of liquid or it may be distributed over a body of packing in the reactor vessel. The reactor vessel is provided with means for introducing catalyst, the hydrocarbon feed, and promoter, and also with means for removing products containing isomerized hydrocarbon. The isomerized product is usually routed to auxiliary separating means which usually comprise fractionating towers for recovery of the isomerized hydrocarbon. Under the above conditions, localized corrosion of the steel vessel and pipes usually employed occurs unless a protective lining or some other means are employed to resist the corrosive tendency of the aforementioned type of catalyst. Provision of reactor vessels with such linings is expensive and does not assure protection against corrosion; formation of cracks in the lining allows ingress of the corrosive fluid to the vessel itself which usually results in its ultimate destruction.

Operators of isomerization processes of the type referred to have gone to extended lengths to protect their catalytic vessels such as injecting a fluid under a positive pressure back of the lining to prevent the catalyst from coming in contact with the shell of the vessel. It will be apparent to the skilled worker in catalytic conversions that such means do not solve the fundamental problem of preventing corrosion attack.

In the present invention an electromotive potential is imposed between the reactor vessel, or pipes coming in contact with the corrosive catalyst and an internal electrode. For example, an electrode, insulated against metallic contact with the reactor vessel, is inserted at the center of the vessel along the axis, or a multiplicity of such electrodes are distributed concentric to the reactor vessel where corrosion is predominant. The positive (+) terminal of a direct current (D. C.) source of electric power is connected to this electrode. The negative (−) terminal is the vessel itself. The above mentioned positive electrode (+) may be a piece of steel pipe or it may be a solid conductor such as, for example, a rod of carbon. The required potential may vary from less than 0.5 volt up to about 10 volts or more, but usually less than 5 volts will be sufficient. In most operations, a voltage in the range of about 0.1 to 3 volts will be sufficient for ample protection of the vessel. Current densities of about 0.001 to 0.05 ampere per square foot of cathode surface will usually be sufficient, but lesser or greater current densities may be employed as conditions warrant. Of course, it is understood that the voltage and amperage required will depend largely upon the conductivity of the catalyst and the length of path between the above mentioned electrode and the reactor vessel.

It is understood that the electrode or electrodes may consist of other metals or metal alloys besides iron, but preferably metals below iron in the electromotive series such as cobalt, nickel, copper and the like may be employed. It is also understood that the electrode may consist of mixtures of metals and various metallic salts or oxides or that a metallic oxide having inhibiting powers may be added to the catalyst such as described in pending application U. S. Serial No. 519,001, filed January 20, 1944, in the name of Thomas B. McCulloch, now abandoned. In the last mentioned application, it is disclosed that arsenic acid and arsenic trioxide may be employed as an inhibitor. The present invention contemplates employment of the salts and oxides of arsenic and other metallic oxides and salts having inhibiting powers within the catalyst itself while imposing a positive E. M. F. on the apparatus being used in the catalytic reaction. Thus, for example, if the electrode is composed of an arsenic salt, arsenic would be plated out on the inner surface of the reactor thus insuring protection against corrosion during periods of failure of the electrode or its connections for any reason whatsoever.

It is also within the scope of the present invention to plate out other metals such as nickel and the like on the inner surface of the lining and pipes by providing the positive electrode of a suitable material that will plate out on the vessel itself. It is thus contemplated that the potential may be imposed on the reactor vessel either intermittently or continuously during the periods of operation of the catalytic reaction. It thus may be desirable to operate an isomerization reactor with electrolytic protection only during initial periods of operation sufficient to plate out a coating on the inner walls of the vessel. Again it may be desirable to give continuous electrolytic protection throughout a given isomerization or catalytic reaction period.

In one specific embodiment of the invention, a catalytic reactor is provided with an electrode arranged in the reactor vessel concentric therewith and extending the length of the vessel or at least throughout the area where corrosion is experienced. As mentioned before the electrode may be constructed of carbon, iron or its alloys, nickel, cobalt, copper, and the like. In cases where the surfaces of the catalytic reactor are such that one surface extends more closely to the electrode than the other surface, it may be desirable to shield a portion or portions of the electrode by insulation so that all surfaces are more or less equidistant from the electrode so that protection is uniform throughout the vessel. In another and perhaps preferred embodiment of the present invention, a catalytic reactor vessel is provided with a grid or screen annular electrode concentric with the reactor vessel. This type of annular electrode may be a grid, a screen, a sheet, or a plurality of electrodes arranged specially around the vessel at a multiplicity of points. Preferably the concentric electrode is a grid or screen arranged at a selected distance from the reactor shell and connected thereto with means for electrically insulating the electrode screen or grid from the catalytic surface to be protected.

The present invention will be further illustrated by reference to the drawings, in which:

Fig. 1 is one embodiment of an isomerization reactor with an electrode arranged at the center of the vessel along an axis thereof;

Fig. 2 is another embodiment of an isomerization reactor with an electrode arranged concentric to the reactor vessel;

Fig. 3 is a section of Fig. 2 taken along the lines III—III in Fig. 2; and

Fig. 4 is a flow diagram of one embodiment of the present invention showing the arrangement of apparatus for protection of an isomerization reactor in accordance with the present invention.

Referring now to the drawings, and specifically to Fig. 1, the numeral 11 designates a reactor vessel such as an isomerization reactor. Catalytic reactor 11 is provided with line 12 for introduction of feed hydrocarbons, promoter, and catalyst thereto and line 13 for withdrawal of product. A draw-off line 14 is also provided which may be used for the introduction of catalyst and withdrawal of spent catalyst therefrom. Vessel 11 has arranged along the center axis thereof an electrode 15 which may be an ordinary iron pipe, a solid rod of iron, a core of carbon, or any other suitable solid conductor of electricity. Electrode 15 rests on a molded block 16 which is a non-conductor such as ceramic material, glass, resins, and the like. Molded block 16 is surrounded by metallic sheet 17 which is welded to cover plate 18. The electrode 15 is provided with means of electrically connecting outside the reactor vessel by means of conductor 19 extending through insulated stuffing box 20. In turn, conductor 19 is connected to a source of direct current (D. C.) of electric power not shown. The conductor is insulated against contact with the complex catalyst as well as the reactor wall. Means for providing direct current are conventional and do not form part of this invention and details thereof are accordingly not given.

Electrode 15 arranged along the center axis of vessel 11 passes through a distributing plate 21 by means of which hydrocarbon is distributed through a body of catalyst indicated by shaded portion 22. It is understood that the electrode 15 is electrically insulated from the distributing plate 21 by suitable means as indicated by 23. The upper portion of reactor vessel 11 indicated by numeral 24 is employed as a separating stage for separation between the catalyst and the hydrocarbon being catalytically converted.

The electrode 15 may be attached or suspended from the top of the reactor vessel by means corresponding to those described with respect to the bottom of the vessel and designated by like reference numerals. It is understood, of course, that the source of the electromotive force may be connected to the electrode 15 either through the top or the bottom of the vessel 11.

Referring now to Fig. 2, a catalytic reactor vessel such as an isomerization reactor 11 is provided with inlet line 12 for introduction of hydrocarbon feed and promoter, an outlet line 13 for withdrawal of product, and a line 14 for introduction of fresh catalyst or withdrawal of spent catalyst. Arranged concentric with the vessel 11 and spaced from the shell of vessel 11 is an electrode 30 which is in the form of a grid, screen or sheet attached to the vessel 11 and electrically insulated therefrom by insulating means 31. Insulating means 31 may be glass, resinous, or ceramic, etc., insulators through which extends bolts 32 which are likewise insulated from the electrode 30 by means of washers 33 which also may be composed of ceramic material, glass, and the like that will insulate the bolt 32 from the electrode 30.

Spaced around the vessel and connected to the electrode 30 are conductor rods 34 which extend through insulated stuffing boxes 35 and connect to electrode 30. Preferably a multiplicity of conductor rods 34 are provided equally spaced around the shell of reactor vessel 11.

Reactor vessels are usually constructed with dished heads, and in order to insure complete protection of vessel 11 it is desirable to provide an electrode conforming to the curvature of the dished head. The electrode may be a single member with portions conforming to the shape of the cylindrical portion of wall of the vessel and other portions conforming to the shape of the dished heads. As an alternative arrangement a plurality of electrodes may be employed with a portion of the total number conforming generally to the shape of the dished heads and employed to protect the heads, while the remainder conform to the shape of the cylindrical portion of the wall of the vessel. In Fig. 2 electrode 30 includes a portion which is concentric to the cylindrical portion of the wall of vessel 11 and serves to protect this portion of the vessel, while the remainder of the electrode conforms to the curvature of the upper head of the vessel and provides protection for this head. A separate electrode 30' conforms to the shape of the lower head of the reaction vessel and is provided with a conductor rod 34' extending through insulated stuffing box 35', which allows the electrode 30' to be charged by means of a source of E. M. F. It will be understood that if desired, the protective means in the reactor vessel may be arranged to have the bottom portion shaped as the top portion to conform to the lower head of the reaction vessel so that a single electrode is employed for protecting the vessel. It will also be understood that if desired, the upper head may be provided with a separate electrode similar to the electrode 30' and another separate electrode employed to protect the cylindrical portion of the reactor.

In the embodiment of Fig. 2 the distance between the shell of the reactor vessel 11 and the electrode or electrodes will be much less than the distance between electrode 15 and the shell of the vessel of Fig. 1; therefore, the embodiment of Fig. 2 would usually be preferred.

Referring now to Fig. 4, a hydrocarbon fraction, such as n-butane, flows through line 40 and is pumped by means of pump 41 into a heater 42 where the temperature is raised sufficiently to cause substantial isomerization thereof when mixed with the complex catalyst mentioned before. The heated butane leaves heater 42 through line 43 at a temperature sufficient to maintain a reactor temperature between 150° to 300° F. and passes into line 12 and into reactor vessel 11. The reactor vessel 11 is provided with concentric electrode 30 which is connected to the positive terminal of a direct current source of E. M. F. 44 through conductor 46. The negative terminal of the direct current source is connected to vessel 11 through conductor 45. It is understood that electrode 30 is electrically insulated from the vessel 11.

The heated hydrocarbon enters the reactor vessel 11 and passes upwardly through distributor plate 21 and on passage through the catalyst indicated by shaded portion 22 is substantially converted to isobutane. The catalyst and hydrocarbon separate in section 24 and the isomerized product flows from vessel 11 through line 13. The isomerized product issuing from reactor vessel by line 13 passes through a cooler 47 where the temperature is reduced. The cooled product is then withdrawn through line 48 into accumulator vessel 49 and pumped by pump 50 into line 51 and discharged into stripper 52. Stripper 52 is provided with a heating means 53 for adjustment of temperature and pressure therein for removal of hydrogen chloride promoter and low-boiling decomposition products; the hydrogen chloride and low-boiling decomposition products issue from stripper 52 by way of line 54. It may be necessary at times to discard some of the gases from line 54 to avoid buildup of light hydrocarbon, and this is accomplished by opening valve 55 in line 54. A recycle line 56 allows return of at least a part of the recovered hydrogen chloride to mix with the fresh feed. Make-up promoter is introduced into the system from a source not shown by opening valve 57 in branch line 58.

The isomerized product stripped of hydrogen chloride and low-boiling decomposition products is discharged from the stripper 52 by way of line 59 and is then routed to further fractionating equipment for recovery of the isomerized product or for handling as may be desired.

While the embodiment of Figure 4 has been described and illustrated with reference to protecting vessel 11 against the corrosive tendency of aluminum halide catalyst, it will be obvious to the skilled worker that the pipe connections and auxiliary equipment may be similarly protected by provision of suitable apparatus for imposition of a potential between an internal electrode and the equipment handling the corrosive fluid.

The present invention may be practiced in either batch or continuous equipment. If batch equipment is used, the liquid or fluid catalyst should be intimately contacted with the hydrocarbons being reacted by provision of suitable mechanical mixing devices, such as paddles, stirrers, and the like.

When the reaction is conducted in continuous equipment as described in the present embodiment, the contact between the liquid or semi-liquid catalyst may be obtained by employment of incorporators, jets, bubble cap towers, packed towers, centrifugal pumps, distributing plates, and other expedients well known to the art.

The aluminum halide complex employed in the reaction mentioned before may be formed by contacting a paraffinic fraction such as n-butane and other members of the same homologous series with an aluminum halide and hydrogen halide under conditions to form the complex. The aluminum halide may be reacted with an aromatic hydrocarbon to form the complex. It is usually customary in reactions of the aforementioned type to employ a catalyst promoter such as anhydrous hydrogen chloride which is usually introduced into the reaction vessel dissolved in the hydrocarbon. It is usual practice to employ between about 3 and 10 mole per cent of the promoter based on the hydrocarbon.

When the method and apparatus of the present invention are employed for catalytically converting normal paraffins into isoparaffins it will be preferred to employ purified normal paraffins of the class of normal butane, pentane, hexane, heptane and the higher paraffin homologues as the feed stock. These materials will, of course, be converted into their corresponding branched-chain forms as isobutane, isopentane, isohexane, isoheptane, and the like. It will be understood, however, that the feed may comprise mixtures of more than one of these straight chain paraffins; or if convenient, the paraffinic hydrocarbon mixture may contain small proportions of branched chain paraffins. However, for greatest efficiency the preferred feed stock will comprise essentially straight chain paraffins. Mixed paraffins, such as straight run naphthas, may thus be converted into mixtures which have improved qualities with respect to antidetonating properties when used as a motor fuel. Also, the iso forms of the paraffin hydrocarbons enter quite readily into further chemical reactions such as alkylation with olefins to form products of high quality and therefore the iso forms of the hydrocarbons are preferred in the industry.

It may be mentioned that the improved apparatus and process of the present invention may be employed for isomerizing paraffinic hydrocarbons and the products from the isomerization step may subsequently be employed in the alkylation of isoparaffins with olefins. When conducting such alkylation operations it is also desirable to utilize the method and apparatus for the alkylation step protected in accordance with the present invention.

The nature and objects of the present invention having been fully described and illustrated, what I wish to claim as new and useful and to secure by Letters Patent is:

1. In a catalytic hydrocarbon conversion process employing an electrically conductive organic complex of an aluminum halide, hydrogen halide and a hydrocarbon in a ferrous metal reaction vessel corrodible by said complex, the step of passing a direct electrical current having a current density in the range between 0.001 and 0.05 ampere per square foot of cathode surface from an electrical conducting means as an anode within said reaction vessel in physical contact with the aluminum halide complex through said complex to the walls of the reaction vessel as a cathode.

2. A method for catalytically converting hydrocarbons which comprises the steps of maintaining within a corrodible ferrous metal reaction vessel an electrically conductive body of liquid aluminum halide catalyst, passing a hydrocarbon fraction within the reaction vessel and contacting it therein with the body of liquid aluminum halide catalyst under conditions to cause a conversion of a substantial portion of said hydrocarbons into other hydrocarbons, passing a direct electrical current having a current density in the range between 0.001 and 0.05 ampere per square foot of cathode surface from an electrical conductor as an anode within the reaction vessel in contact with the liquid aluminum halide catalyst through the catalyst to the walls of the reaction vessel as a cathode and recovering a product comprising converted hydrocarbons.

3. A method for catalytically converting hydrocarbons which comprises the steps of maintaining within a corrodible ferrous metal reaction vessel an electrically conductive body of liquid aluminum halide catalyst complex of aluminum halide, hydrogen halide and a hydrocarbon, passing a hydrocarbon feed stock into the reaction vessel and contacting it with the body of liquid aluminum halide catalyst complex therein under conditions to cause a conversion of at least a portion of said hydrocarbons into other hydrocarbons, passing a direct electrical current having a current density in the range between 0.001 and 0.05 ampere per square foot of cathode surface from an electrical conductor as an anode in contact with the liquid aluminum halide catalyst complex through the catalyst to the walls of the reaction vessel as a cathode and removing from said reaction vessel a product comprising converted hydrocarbons.

4. The method of catalytically converting hydrocarbons in the presence of a substantially anhydrous metallic halide-hydrocarbon complex liquid catalyst, which comprises passing the hydrocarbons in contact with the substantially anhydrous liquid complex catalyst confined within a metallic reaction vessel under conversion conditions at elevated temperature, such that substantial corrosion of the metallic reaction vessel would normally occur, and simultaneously passing an impressed direct electrical current through the liquid catalyst uniformly to said metallic reaction vessel serving as the cathode at a current density sufficient to reduce the corrosion rate of said anhydrous metallic halide-hydrocarbon complex liquid catalyst on said metallic reaction vessel below that normally obtaining in the absence of said impressed current.

OTTO GERBES.

REFERENCES CITED

The following references are of record in the file of this patent:

UNITED STATES PATENTS

| Number | Name | Date |
|---|---|---|
| 534,033 | Craney | Feb. 12, 1895 |
| 914,916 | Beneker | Mar. 9, 1909 |
| 1,365,141 | Adam | Jan. 11, 1921 |
| 1,506,306 | Kirkaldy | Aug. 26, 1924 |
| 1,545,384 | Ashcroft | July 7, 1925 |
| 1,678,775 | Gravell | July 31, 1928 |
| 1,770,828 | Arent | July 15, 1930 |
| 1,789,385 | Heath | Jan. 20, 1931 |
| 1,891,005 | Neeley | Dec. 13, 1932 |
| 2,221,997 | Polin | Nov. 19, 1940 |
| 2,266,011 | d'Ouville et al. | Dec. 16, 1941 |
| 2,311,144 | Wickham et al. | Feb. 16, 1943 |
| 2,355,563 | Schulze | Aug. 8, 1944 |
| 2,374,518 | Wolk et al. | Apr. 24, 1945 |
| 2,411,483 | Wachter et al. | Nov. 19, 1946 |

FOREIGN PATENTS

| Number | Country | Date |
|---|---|---|
| 188,957 | Great Britain | Nov. 23, 1922 |
| 543,627 | Great Britain | Mar. 5, 1942 |

OTHER REFERENCES

Transactions of the Electrochemical Soc., vol. 75 (1939) page 31.

McKinney, Transactions of the Electrochemical Soc., vol. 75, 32–35 (1939).

Neminskii et al., Chem. Abs. vol. 3, 1147 (1909).